(12) United States Patent
Shen

(10) Patent No.: US 7,660,655 B2
(45) Date of Patent: Feb. 9, 2010

(54) SUPPLEMENTAL RESTRAINT DEPLOYMENT METHOD WITH DISPLACEMENT-BASED DEPLOYMENT IMMUNITY

(75) Inventor: Junqiang Shen, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 1031 days.

(21) Appl. No.: 10/958,749

(22) Filed: Oct. 5, 2004

(65) Prior Publication Data

US 2006/0074536 A1    Apr. 6, 2006

(51) Int. Cl.
*E05F 15/00* (2006.01)

(52) U.S. Cl. .................... 701/45; 701/46; 280/735; 307/10.1

(58) Field of Classification Search .......... 701/45–46; 180/282; 280/735; 307/10.1
See application file for complete search history.

(56) References Cited

U.S. PATENT DOCUMENTS

| | | | | |
|---|---|---|---|---|
| 5,430,649 | A | 7/1995 | Cashler et al. | 364/424.05 |
| 5,692,775 | A | 12/1997 | Foo | 280/735 |
| 5,702,124 | A * | 12/1997 | Foo et al. | 280/735 |
| 6,036,225 | A * | 3/2000 | Foo et al. | 280/735 |
| 6,186,539 | B1 * | 2/2001 | Foo et al. | 280/735 |
| 6,439,007 | B1 * | 8/2002 | Foo et al. | 70/45 |
| 6,520,536 | B2 * | 2/2003 | Foo et al. | 280/735 |
| 6,529,810 | B2 * | 3/2003 | Foo et al. | 701/45 |
| 6,549,836 | B1 * | 4/2003 | Yeh et al. | 701/45 |
| 6,756,889 | B2 * | 6/2004 | Sala et al. | 340/436 |
| 6,776,435 | B2 * | 8/2004 | Foo et al. | 280/735 |
| 6,816,766 | B2 * | 11/2004 | Sala et al. | 701/45 |
| 7,359,781 | B2 * | 4/2008 | Foo et al. | 701/45 |
| 2002/0145273 | A1 * | 10/2002 | Foo et al. | 280/735 |
| 2002/0147533 | A1 * | 10/2002 | Foo et al. | 701/45 |
| 2002/0163170 | A1 * | 11/2002 | Foo et al. | 280/735 |
| 2005/0006886 | A1 * | 1/2005 | Foo et al. | 280/735 |
| 2006/0074536 | A1 * | 4/2006 | Shen | 701/45 |

FOREIGN PATENT DOCUMENTS

| | | | |
|---|---|---|---|
| DE | 19535633 A1 * | 3/1996 |
| JP | 06092199 A * | 4/1994 |
| JP | 2972559 B2 * | 11/1999 |

OTHER PUBLICATIONS

Intelligent airbag deployment algorithm design and implemented by DSP chip; Yi-Jen Mon; Computer and Information Science, 2005. Fourth Annual ACIS International Conference on; 2005 pp. 358-363; Digital Object Identifier 10.1109/ICIS.2005.76.*

(Continued)

*Primary Examiner*—Cuong H Nguyen
(74) *Attorney, Agent, or Firm*—Jimmy L. Funke

(57) ABSTRACT

Occupant displacement corresponding to sensed acceleration in a crash event is determined and used to enable and disable deployment of supplemental restraints based on crash severity. The determined occupant displacement is compared to a first threshold calibrated to discriminate against disturbances due to rough roads and other non-crash events, and a second threshold calibrated to discriminate against non-deployment crash events. Deployment of supplemental restraints based on crash severity is enabled only when the determined displacement is between the first and second thresholds.

5 Claims, 4 Drawing Sheets

OTHER PUBLICATIONS

Intelligent vehicle airbag controller design; Yi-Jen Mon; Kuang-Tso Luo; Cybernetics and Intelligent Systems, 2004 IEEE Conference on; vol. 2, 2004 pp. 908-913; Digital Object Identifier 10.1109/ICCIS.2004.1460709.*

An article entitled "Side Impact and Sensing" by Kevin Jost, May 1995, Automotive Engineering pp. 62-63, cited by other.*

An article entitled "Steuerung eines Mehr-fach-Ruckhaltesystems, Controls for a Multiple Passenger Restraint System", by Von Guido Wetzel, Oct. 1994, ATZ Automobiltechnische Zeitschrift, pp. 618-619. Appears to disclose a control arrangement for an occupant side restraining system, cited by other.*

* cited by examiner

SUPPLEMENTAL RESTRAINT DEPLOYMENT METHOD WITH DISPLACEMENT-BASED DEPLOYMENT IMMUNITY

TECHNICAL FIELD

The present invention relates to vehicle supplemental restraint systems, and more particularly to a deployment immunity method that reliably distinguishes between deployment events and non-deployment events.

BACKGROUND OF THE INVENTION

Vehicle supplemental restraint systems perform a number of functions including acceleration sensing, signal processing and analysis, and deployment of one or more restraint devices such as frontal or side air bags and seat belt pretensioners in response to a sensed crash event. Typically, the acceleration signal is monitored to detect the onset of a crash event (as indicated by acceleration in excess of a reference value, for example), and then filtered or integrated over the course of the crash event to determine the change in velocity due to the crash. The change in velocity ($\Delta V$) is indicative of the crash severity, and may be compared to a calibrated threshold to determine if the crash event is sufficiently severe to warrant deployment of restraints. Other measures of crash severity may also be used.

While being conceptually simple, the above-described approach can be problematic in practice because it is sometimes difficult to rule out acceleration disturbances due to rough road surfaces, particularly when the deployment decision must be made in a very early stage of the crash event. It can also be difficult to reliably distinguish between deployment crash events and non-deployment crash events, particularly since non-deployment events sometimes result in relatively high $\Delta V$ levels in the later stage of the crash event. Many procedures and rules have been devised for overcoming these problems, but they tend to be overly complicated and heuristic in nature rather than physics-based. Accordingly, what is needed is a physics-based, easily implemented method of providing immunity from deployment due to rough road surfaces and other non-crash events and reliably distinguishing between deployment and non-deployment crash events, while providing timely and reliable deployment determination.

SUMMARY OF THE PRESENT INVENTION

The present invention is directed to an improved deployment immunity method for a supplemental restraint where occupant displacement due to a crash event is determined and used to enable and disable deployment of supplemental restraints based on crash severity. The determined occupant displacement is compared to a first threshold calibrated to discriminate against disturbances due to rough roads and other non-crash events and a second threshold calibrated to discriminate against non-deployment crash events. Deployment of supplemental restraints based on crash severity is enabled only when the determined displacement is between the first and second thresholds effectively providing a deployment immunity gate that is not time dependent.

DESCRIPTION OF THE PREFERRED EMBODIMENT

Figure 1:
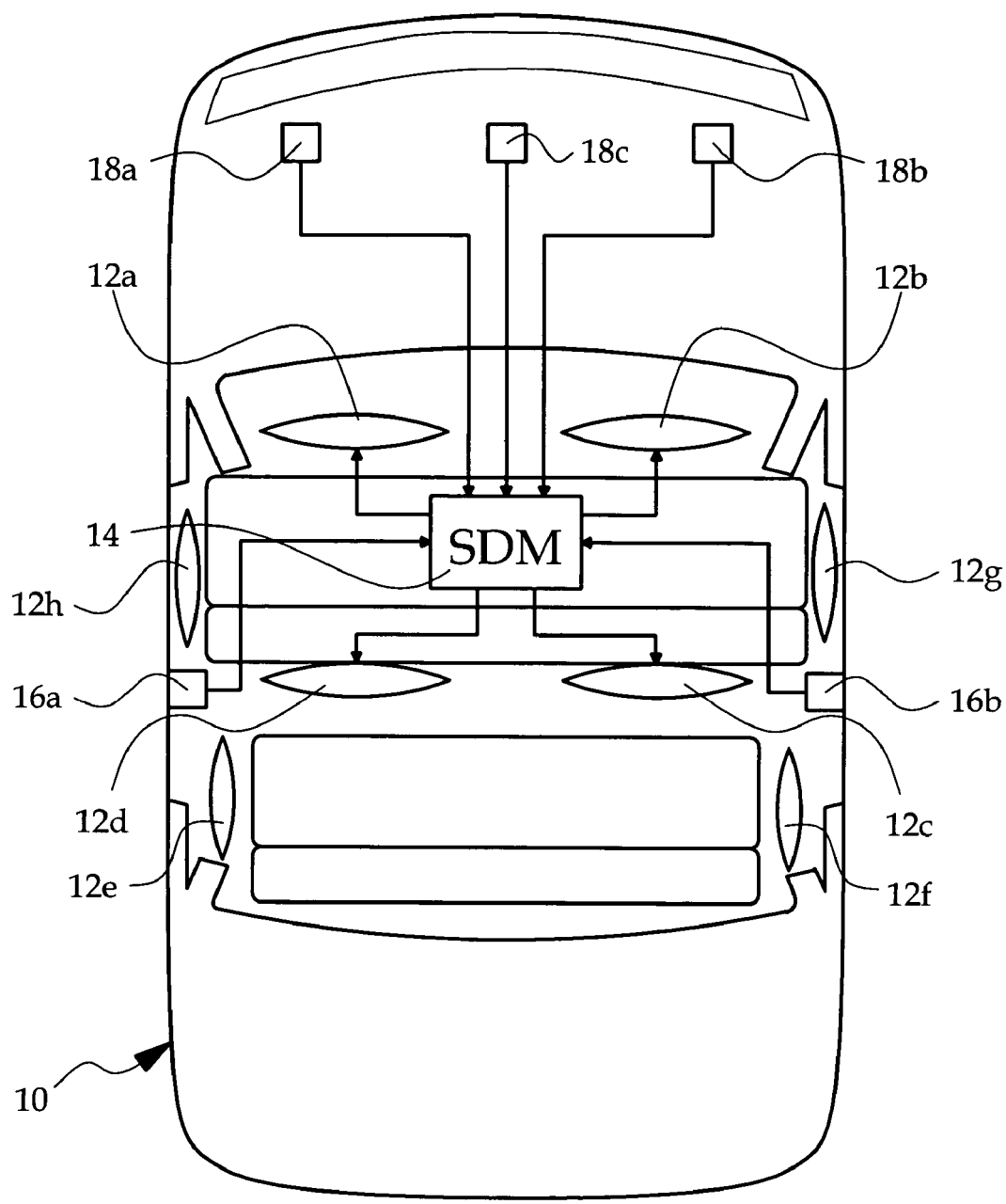
FIG. 1 is a schematic diagram of a supplemental restraint system including a programmed microprocessor for carrying out the deployment method of this invention.

FIG. 1 generally depicts a supplemental restraint system installed in a vehicle 10. The restraint system includes a number of restraints 12a, 12b, 12c, 12d such as air bags that are variously deployed in a severe crash event to protect the vehicle occupants. The restraints may include without limitation, air bags, belt pretensioners, inflatable tubular structures, side curtains, anti-whiplash devices, etc., and it will be understood that the term airbag as used herein does not refer exclusively to a particular type of restraint. A deployment control module (SDM), designated generally by the reference numeral 14, is mounted on a frame element in a central portion of the vehicle 10. In the illustrated embodiment, the restraint system includes a longitudinal acceleration sensor within the SDM 14, a pair of side impact acceleration sensors 16a, 16b and three electronic frontal acceleration sensors 18a, 18b, 18c. The SDM 14 additionally includes a programmed microprocessor for receiving the output signals of the acceleration sensors and circuitry for deploying some or all of the restraints 12a-12d in the event of a severe crash.

In general, SDM 14 integrates each acceleration signal with a decay factor (to compensate for sensor bias) to determine the corresponding change in velocity $\Delta V$, and integrates the $\Delta V$ signal to determine the associated occupant displacement D. At each sample of the acceleration signal A(I), the velocity V(I) and the displacement D(I) are given by:

$$V(I)=V(I-1)+A(I)-C$$

$$D(I)=D(I-1)+V(I)$$

where V(I−1) is the previous value of the velocity $\Delta V$, D(I−1) is the previous value of the displacement D, and C is a velocity decay constant.

Figure 2:
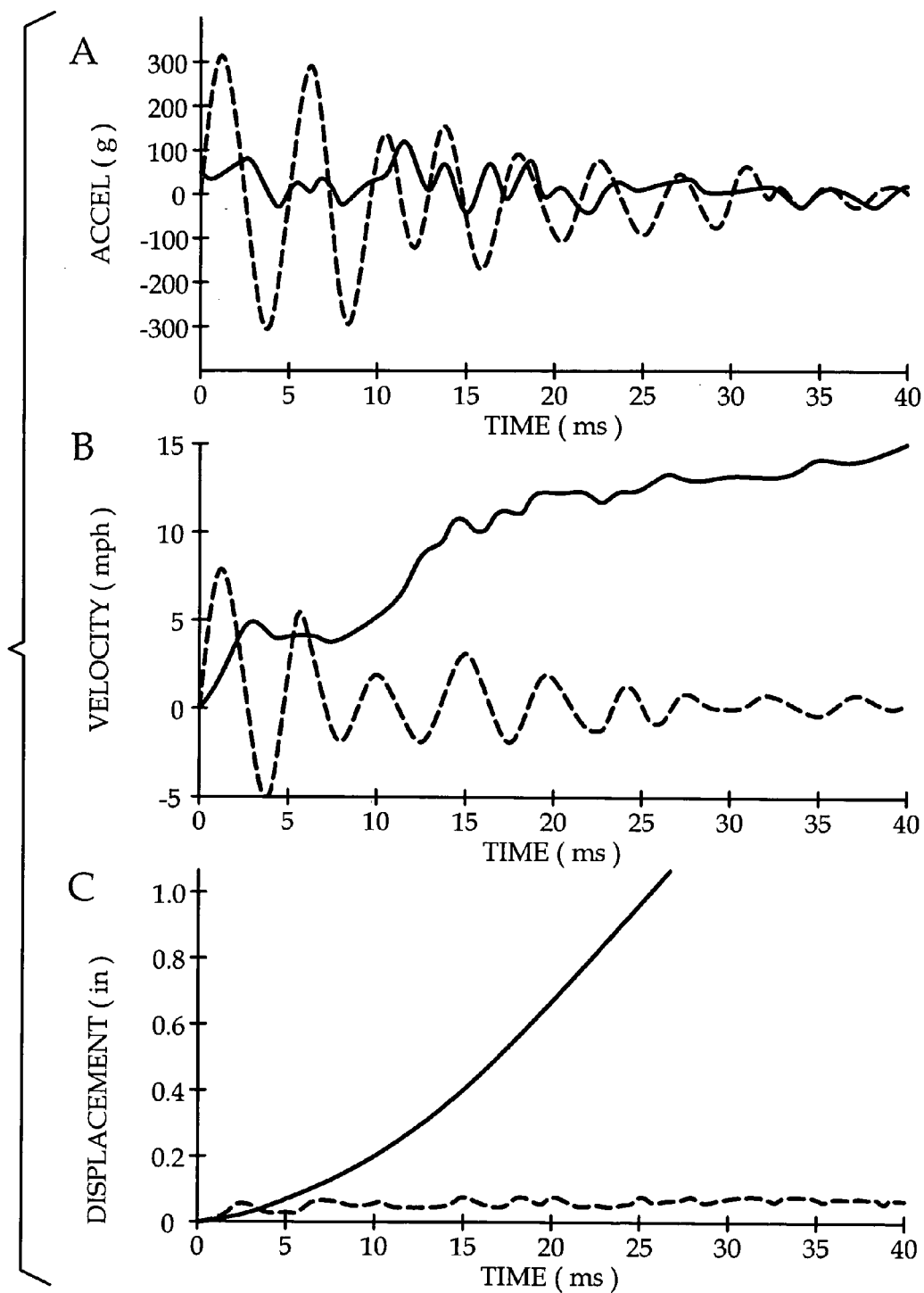
FIG. 2, Graphs A, B and C, depict crash signals developed by the system of FIG. 1 in the course of a non-crash event and a crash event for which supplemental restraints should be deployed. Graph A depicts sensed acceleration, Graph B depicts $\Delta V$ and Graph C depicts displacement, all as a function of time.

Graphs A, B and C of FIG. 2 respectively depict the acceleration A, velocity V and displacement D for both a non-crash event (dashed traces) and a crash event for which supplemental restraints should be deployed (solid traces). The non-crash event in this case is a hammer blow to the B-pillar of a vehicle in which the system 10 is installed, which produces acceleration signals similar to other non-deploy events such as driving over a rough road surface. The crash event is a side impact with a pole at a lateral velocity of 18 MPH; this is a deploy event, which requires a deployment decision 6.5 milliseconds after the acceleration exceeds an initial threshold. It is apparent from Graph A that the crash and non-crash events cannot be distinguished based on the acceleration signals, since non-crash events can produce acceleration signals having approximately the same frequency content, and even higher amplitude, than a crash event. Turning to Graph B, it will be seen that the velocity signals can be used to distinguish between the crash and non-crash events, but sufficient separation between the two traces does not reliably occur until approximately 10 milliseconds, which is well after the desired time of deployment. On the other hand, the crash and non-crash events produce early and widely disparate displacement of the occupant, as seen in Graph C, enabling early discrimination between crash events and non-crash events. In the illustrated and other similar data, comparing occupant displacement to a first threshold of, say, 0.075 inch would provide reliable discrimination between crash events and non-crash events at approximately 5 milliseconds after the onset of the crash event. The present invention allows the supplemental restraints to be deployed based on crash severity (velocity exceeding a threshold, for example), but only after the displacement exceeds the first threshold, thereby providing immunity from deployment due to non-crash events while retaining the flexibility to judge crash severity in whatever manner seems appropriate.

Figure 3:
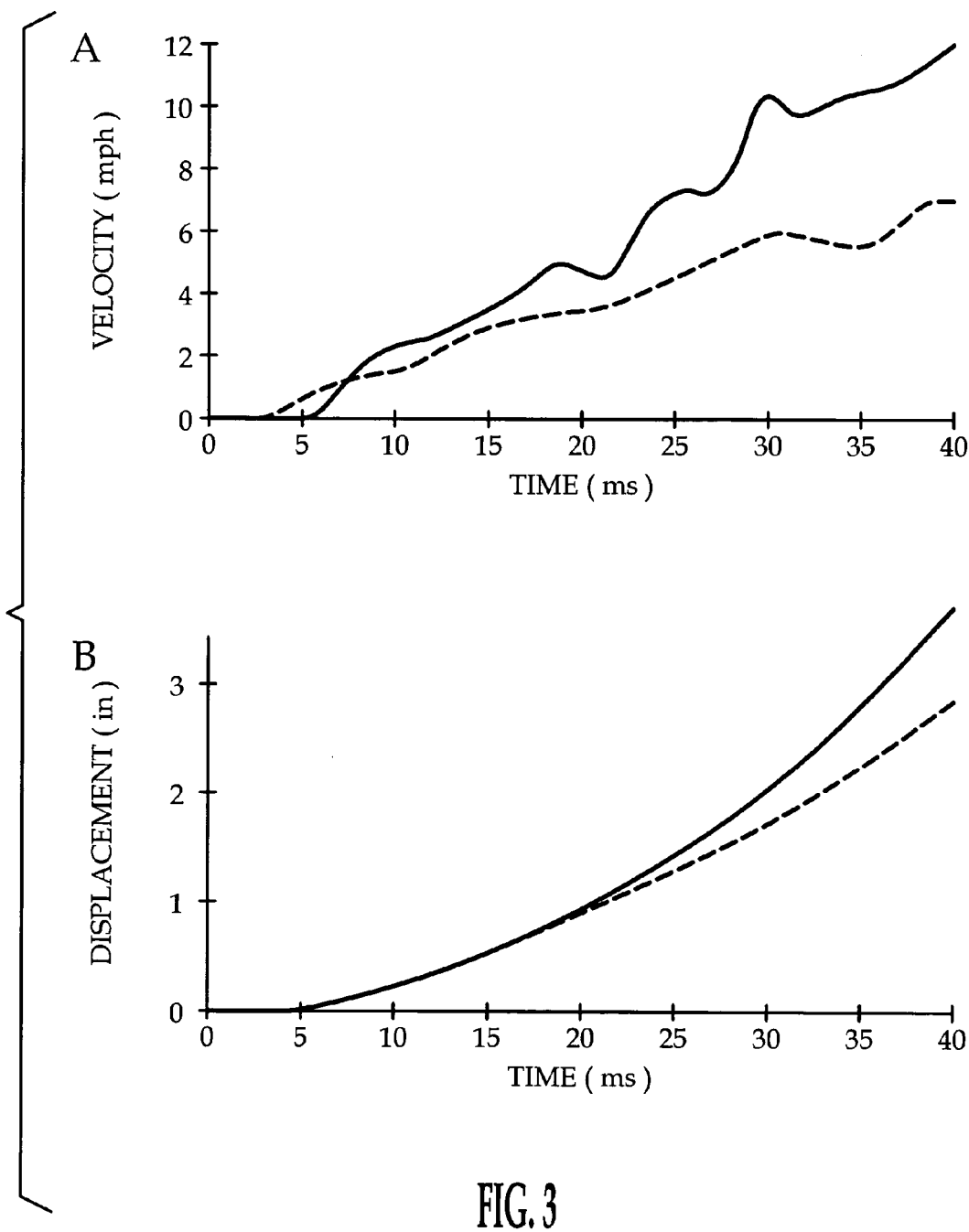
FIG. 3, Graphs A and B, depict crash signals developed by the system of FIG. 1 in the course of a crash event for which supplemental restraints should be deployed and a crash event for which supplemental restraints should not be deployed. Graph A depicts $\Delta V$ and Graph B depicts displacement, both as a function of time.

Graphs A and B of FIG. 3 respectively depict the velocity V and displacement D for two crash events: one for which supplemental restraints should not be deployed (dashed traces) and one for which supplemental restraints should be deployed (solid traces). The non-deployment event is a 12 MPH frontal impact, while the deployment event is a 16 MPH frontal impact, requiring a deployment decision 24 milliseconds after the acceleration exceeds an initial threshold. If $\Delta V$ is used as the severity measure, the restraints can be timely deployed for the deployment event by setting a velocity threshold VEL_THR at approximately 5.9 MPH. However, the $\Delta V$ measure for the non-deployment event also eventually exceeds VEL_THR at about 37 milliseconds after crash onset; this will result in a late and undesired deployment of the restraints if such deployment is not otherwise disabled. According to this invention, however, the displacement signal can be used to discriminate against the non-deployment event due to the divergence between the deployment and non-deployment displacements after approximately 23 milliseconds. A deployment disable based on this phenomenon is implemented by comparing the displacement signal to a second threshold such as 1.0 inch, and disabling restraint deployment after the displacement signal reaches the second threshold. In the illustrated example, timely restraint deployment is enabled in the deployment event because the $\Delta V$ signal crosses VEL_THR well before the associated displacement signal reaches the second displacement threshold. On the other hand, restraint deployment does not occur in the non-deployment event because the $\Delta V$ signal crosses VEL_THR after the associated displacement signal reaches the second displacement threshold. Physically, the second displacement signal corresponds to occupant displacement due to the crash event, and the method of the present invention prevents deployment of the restraints if deployment has not already occurred by the time the occupant displacement reaches the second displacement threshold. However crash severity is determined, using displacement to enable and disable deployment provides immunity from deployment due to non-deployment events.

Figure 4:
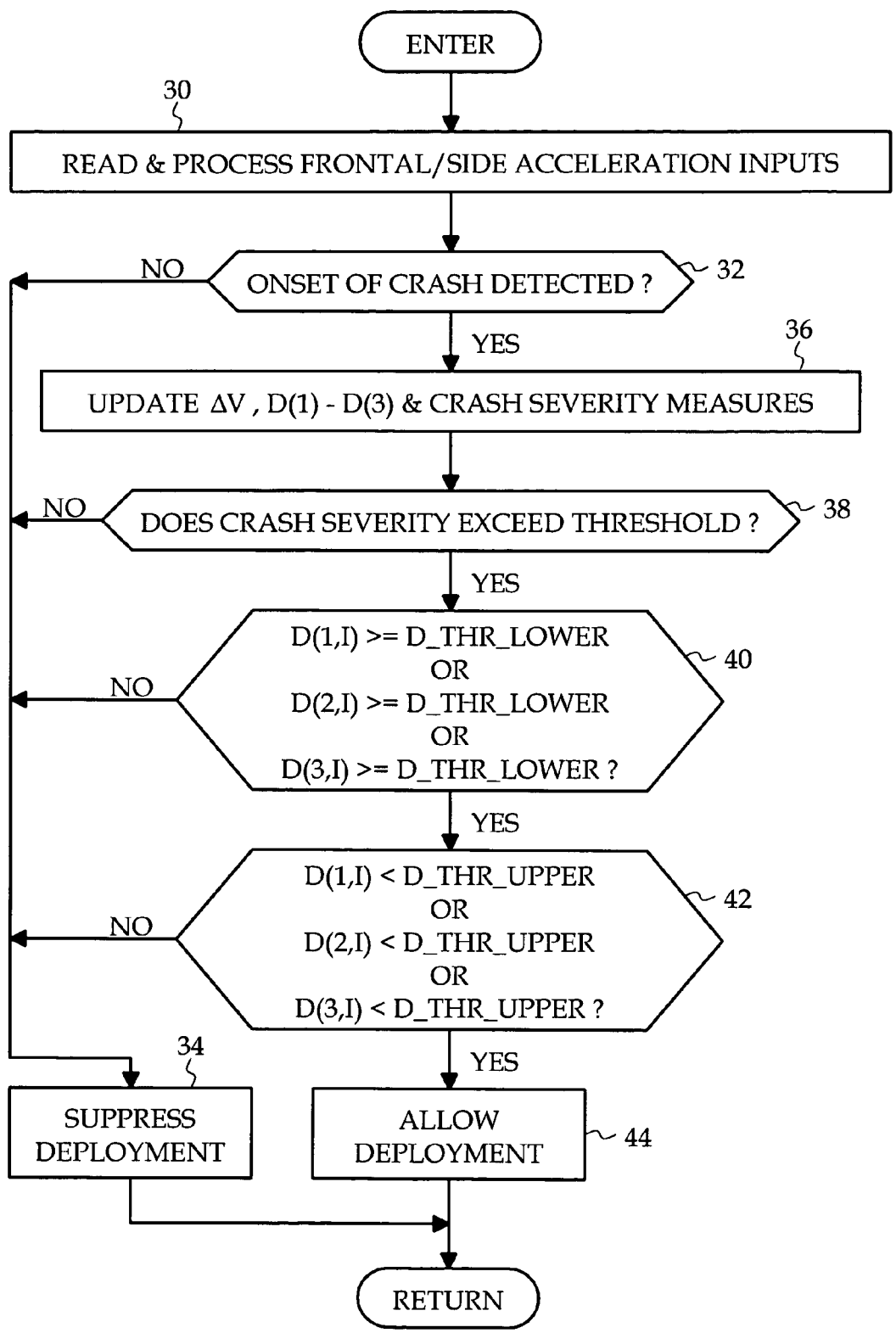
FIG. 4 is a flow diagram representative of a software routine executed by the programmed microprocessor of FIG. 1 for carrying out the method of this invention.

The flow diagram of FIG. 4 represents a software routine that is periodically executed by the SDM 14 of FIG. 1 in carrying out the method of the present invention for a frontal impact. A similar routine can be executed for side impacts. The block 30 is first executed to read and process the various acceleration signal inputs. The block 32 asks if the onset of a crash event has been detected, as may be determined by comparing the acceleration signals to a threshold, for example. If the onset of a crash has not been detected, the block 34 is executed to suppress deployment of the restraints; otherwise, the blocks 36-42 are executed to determine if deployment of the restraints should be allowed. The block 36 updates $\Delta V$ signal and displacement signals for each of the acceleration sensors, as well as any other crash severity measure. The block 38 determines if the crash severity exceeds a threshold such as the threshold VEL_THR mentioned above in respect to FIG. 3. If the crash severity does not exceed the threshold, the block 34 is executed to suppress deployment of the restraints; otherwise, the blocks 40-42 are executed to determine if deployment of the restraints should be allowed based on the displacement signal(s). In the illustrated embodiment where there are three frontal acceleration sensors 18a, 18b, 18c, the block 40 compares each respective displacement signal D(1, I), D(2, I), D(3, I) to the first or lower displacement threshold D_THR_LOWER, and the block 42 compares each respective displacement signal to the second or upper displacement threshold D_THR_UPPER. If one or more of the displacement signals is greater than or equal to D_THR_LOWER, and one or more of the displacement signals is less than D_THR_UPPER, the block 44 is executed to allow restraint deployment. Otherwise, the block 34 is executed to suppress restraint deployment. It will be recognized that the functionality of blocks 42 and 44 may be extended to side impact collisions and to frontal or side impact collisions based on more or fewer acceleration sensor inputs.

In summary, the present invention provides an effective and easily implemented method of using a computed displacement measure to reliably discriminate against both non-crash events and non-deployment crash events, effectively providing an immunity gate that is not time dependent. While the method of the present invention has been described with respect to the illustrated embodiment, it is recognized that numerous modifications and variations in addition to those mentioned herein will occur to those skilled in the art. For example, the method may be applied to systems having fewer or more crash sensors than illustrated, crash severity may be judged by factors instead of or in addition to change in velocity, and so on. Accordingly, it is intended that the invention not be limited to the disclosed embodiment, but that it have the full scope permitted by the language of the following claims.

The invention claimed is:

1. A method of deploying a vehicle supplemental restraint based on a measure of vehicle acceleration and a crash severity indication, the method comprising the steps of:
   periodically sampling the measure of vehicle acceleration and determining a corresponding displacement value following a detected onset of a potential crash event;
   comparing the displacement value to an upper threshold value;
   determining that a deployment immunity condition is satisfied when said displacement value is less than said upper threshold value, and not satisfied when said displacement value exceeds said upper threshold value; and
   allowing deployment of the supplemental restraint based on the crash severity indication only when said deployment immunity condition is satisfied.

2. The method of claim 1, where:
   there are two or more measures of vehicle acceleration that are each periodically sampled to determine two or more corresponding displacement values following the detected onset of a potential crash event; and
   said deployment immunity condition is satisfied when one or more of said displacement values is less than said upper threshold value, and not satisfied when all of said displacement values exceed said upper threshold value.

3. The method of claim 1, including the steps of:

comparing the displacement value to a lower threshold value that is lower than said upper threshold value; and determining that said deployment immunity condition is satisfied when said displacement value exceeds said lower threshold value but is less than said upper threshold value, and not satisfied when said displacement value is less than said lower threshold value.

4. The method of claim 3, wherein said lower threshold value is calibrated to discriminate against displacement values that occur due to non-crash events, and said upper threshold value corresponds to a predetermined displacement of a vehicle occupant following said detected onset.

5. The method of claim 3, wherein:

there are two or more measures of vehicle acceleration that are each periodically sampled to determine two or more corresponding displacement values following the detected onset of a potential crash event; and said deployment immunity condition is satisfied if one or more of said displacement values exceeds said lower threshold value and one or more of said displacement values is less than said upper threshold value.

* * * * *